(12) United States Patent
Narcy et al.

(10) Patent No.: US 7,409,792 B2
(45) Date of Patent: Aug. 12, 2008

(54) NIGHT VISION AIMING SIGHT WITH TWO EYEPIECES

(75) Inventors: Gabriel Narcy, Saint Heand (FR); Jean-Luc Espie, Mornant (FR)

(73) Assignee: Thales (FR)

( * ) Notice: Subject to any disclaimer, the term of this patent is extended or adjusted under 35 U.S.C. 154(b) by 206 days.

(21) Appl. No.: 10/565,600

(22) PCT Filed: Jul. 9, 2004

(86) PCT No.: PCT/EP2004/051438
§ 371 (c)(1),
(2), (4) Date: Jan. 24, 2006

(87) PCT Pub. No.: WO2005/017441
PCT Pub. Date: Feb. 24, 2005

(65) Prior Publication Data
US 2006/0230665 A1      Oct. 19, 2006

(30) Foreign Application Priority Data
Jul. 25, 2003   (FR) ................................... 03 09165

(51) Int. Cl.
*F41G 1/387* (2006.01)
(52) U.S. Cl. ........................................................ 42/120
(58) Field of Classification Search ................. 42/114, 42/115, 120, 121
See application file for complete search history.

(56) References Cited
U.S. PATENT DOCUMENTS
4,721,374 A    1/1988   Loy et al.
4,758,076 A    7/1988   Loy et al.
5,239,411 A    8/1993   Espie et al.
5,282,082 A    1/1994   Espie et al.
5,712,726 A    1/1998   Espie et al.
5,742,434 A *  4/1998   Carmeli ....................... 359/629
H1891 H       10/2000   McClenahan et al.
6,172,821 B1 * 1/2001   Isbell et al. .................. 359/809

FOREIGN PATENT DOCUMENTS
CA    2330867 A1    7/2001
EP    0777142 A2    6/1997
EP    1235095 A1    8/2002

OTHER PUBLICATIONS
Abstract of EP0777142 Jun. 4, 1997 Carmeli Ran.
Abstract of EP 1235095 A Aug. 28, 2002.
Abstract of CA2330867 Hope Richard W.

* cited by examiner

Primary Examiner—Stephen M Johnson
(74) Attorney, Agent, or Firm—Lowe Hauptman Ham & Berner, LLP

(57) ABSTRACT

The field of the invention is that of weapon aiming sights having a light intensifier. To make certain firing modes safe, a weapon may be provided with a camera allowing a soldier to take aim while remaining protected. The proposed invention allows this function to be fulfilled at night. For this purpose, a night vision aiming sight with a light intensifier comprising two optical channels is fitted onto the weapon. The first optical channel provides the camera placed on the weapon with an intensified image. The second optical channel provides the firer with a directly observable intensified image. In a variant, the aiming sight also includes a display that supplies the soldier with additional information superimposed on the intensified images.

16 Claims, 6 Drawing Sheets

NIGHT VISION AIMING SIGHT WITH TWO EYEPIECES

BACKGROUND OF THE INVENTION

1. Field of the Invention

The field of the invention is that of weapon aiming sights having a light intensifier.

2. Description of the Prior Art

It is of paramount importance for a soldier to maintain very good mobility in all mission situations and particularly when he is moving around in an urban environment. When a soldier is aiming his weapon, he may become a potential target. To obviate this drawback, a video camera is placed on the barrel of the weapon, this camera being, for example of the CCD (charge coupled device) sensor type. This camera is coupled either to a helmet sight positioned on the soldier's helmet, or to an imager positioned for example on his wrist. This device allows the soldier to take a shifted sight of the target and consequently allows him to fire while remaining protected. However, the firing configuration most often used nevertheless remains that in which the soldier takes direct aim of the target with the naked eye. The camera must therefore be sufficiently small and shifted away from the line of sight so as not to impede this conventional firing configuration. This configuration is illustrated in FIG. 4, which shows a perspective view of the weapon/camera system. The line of sight 100 of the camera 1 is shifted away from the line of sight 200 of the soldier so as to provide him with a correct sight without being impeded by the camera.

For carrying out night missions, it is conventional to fit a night vision sight on the weapon. This sight generally comprises at least one objective, a light intensifier device and an eyepiece. The objective forms an image of the external scenery on the entrance window of the intensifier device. This comprises three main parts: a first photosensitive surface, which converts the optical image into an electronic image; an electron amplifier, which amplifies the electronic image; and a second surface that converts the electronic image into an amplified light image. Thus, the image of the external scenery is amplified, then collimated to infinity by the eyepiece before finally being observed by the soldier. In this case, the image provided by the camera is of course lost, the light levels being too low to allow a correct image with current sensors. Thus the security provided by the camera during daytime missions is lost. It should be recalled that the soldier may be pinpointed at night by combatants that have either light intensifier binoculars or thermal cameras.

SUMMARY OF THE INVENTION

The night vision sight according to the invention allows the soldier to have the same safety when firing at night as during the daytime, the principle being to supply, simultaneously, the soldier and the camera with the same intensified image, which may thus be looked at directly or via a helmet sight or a display. For night-time missions, this sight easily fits onto the weapon without any modifications to the camera already in place. Thus, the soldier does not have to carry out complex mechanical manipulations in a combat situation.

More precisely, the subject of the invention is an aiming sight for a weapon, comprising an objective and an image intensifier, these being placed in a mechanical assembly having an interface for fastening on to said weapon, said objective forming the image of the external scenery on the entrance window of the image intensifier, said weapon including a sight camera whose optical axis is parallel to the axis of its barrel, said sight comprising at least:

a first optical channel giving, from the intensified image coming from the image intensifier, a first collimated image; and a second optical channel giving, from the intensified image coming from the image intensifier, a second image which is also collimated, the optical axis of which is parallel to the optical axis of the first optical channel, these channels being arranged in such a way that, when the sight is mounted on the weapon via its fastening interface, the first image is sent to the objective of the camera and the second image is sent to the eye of the soldier carrying the weapon.

Advantageously, the first optical channel comprises at least one image transfer optic for the intensified image coming from the image intensifier, a semireflecting plate, a first relay optic, a first eyepiece, the final image from the first eyepiece being substantially collimated and the exit pupil of said first optical channel being substantially coincident with the entrance pupil of the objective of the camera when the sight is mounted on the weapon. Furthermore, the second optical channel comprises at least the image transfer optic for the intensified image coming from the image intensifier, the semireflecting plate, a second relay optic, and a second eyepiece, the final image from the second eyepiece being substantially collimated and the exit pupil of said second optical channel being sufficiently far from the body of the sight, from the camera and from the weapon in such a way that the soldier can position his eye in said pupil with no great trouble.

Advantageously, the sight also includes a third optical channel comprising a microdisplay composed of at least one display and of a second image transfer objective forming an intermediate image of the image from display, said intermediate image being sent by reflection and by transmission by the semireflecting plate on the one hand, into the first optical channel and, on the other hand, into the second optical channel superimposed on the intensified image from the image intensifier.

BRIEF DESCRIPTION OF THE DRAWINGS

The invention will be more clearly understood and further advantages will become apparent upon reading the description that follows, given by way of nonlimiting example and with the help of the appended figures in which.

MORE DETAILED DESCRIPTION

Figure 1:
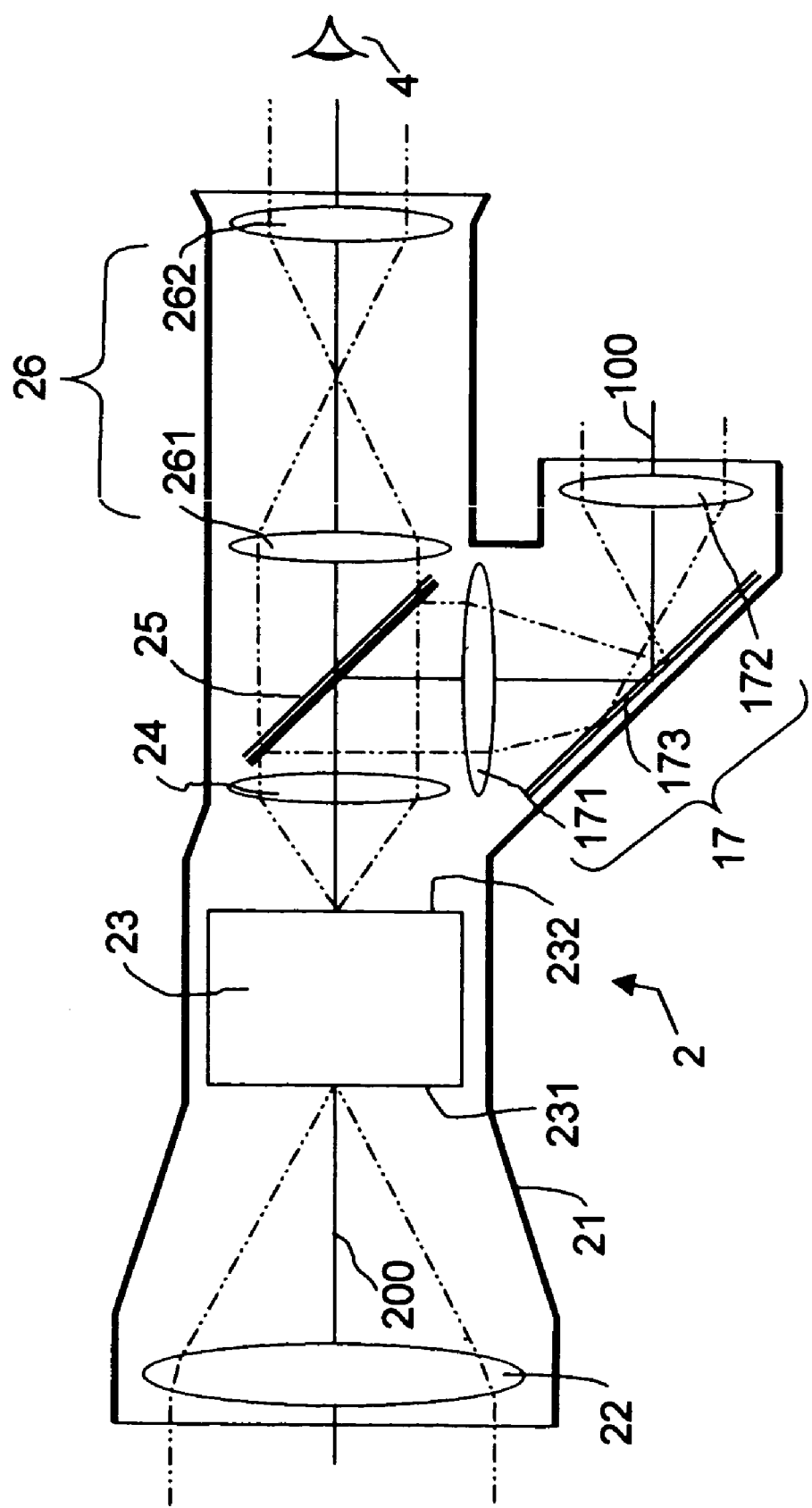
FIG. 1 shows a schematic view of the night vision aiming sight according to the invention.

FIG. 1 shows a schematic view of the night vision aiming sight 2 according to the invention. The path of the light rays coming from an object point located at infinity on the optical axis of the sight is indicated by dotted lines, thus making it possible to follow the various focusing and collimating operations carried out on the light rays through the various optics of the aiming sight.

The latter comprises an objective 22 that forms an image of the external scenery on the entrance window 231 of an image intensifier device 23. This gives, on its exit window 232, an inverted intensified image. Two optical channels placed behind the intensifier 23 each give a collimated image. These two optical channels have a common part formed from an image transfer optic 24 and a semireflecting plate 25.

The transfer optic 24 provides a first image of the intensified image coming from the intensifier 23. In FIG. 1, the semireflecting plate 25 reflects part of said image into a first optical channel and transmits the other part into the second optical channel. The semireflecting plate is a plate having plane parallel faces. Its treatment is adapted according to the optical channel that it is desired to privilege. Of course, the optical channels could be reversed.

The specific part 17 of the first optical channel essentially comprises a first relay optic 171, a plane mirror 173 and an eyepiece 172. The first relay optic focuses the image coming from the optic 24 onto the focus of the eyepiece 172, which gives a final image at infinity. The plane mirror 173 folds the optical beams so that the optical axis 100 of the eyepiece is parallel to the line of sight 200 of the second optical channel.

Conventionally, the optical magnification of the first optical channel is equal to the ratio of the focal length of the objective 22 to the focal length of the eyepiece 172 divided by the magnification of the transfer optic 24/relay optic 171 combination.

The specific part 26 of the second optical channel essentially comprises a second relay optic 261 and an eyepiece 262. The second relay optic focuses the image coming from the optic 24 on to the focus of the eyepiece 262, which gives a final image at infinity. The pupil of the second optical channel is placed in such a way that its image through the various optical elements 24, 261 and 262 is sufficiently far from the optic 262 so that the soldier's eye 4 can be positioned in this pupil with no great trouble. The eyepiece may be provided with a dioptric adjustment so as to optimize the sight comfort for the soldier.

Conventionally, the optical magnification of the second optical channel is equal to the ratio of the focal length of the objective 22 to the focal length of the eyepiece 262 divided by the magnification of the transfer optic 24/relay optic 261 combination.

The various faces of the lenses are antireflection treated so as to optimize the light transmission and to reduce spurious images due to multiple reflections.

It should be noted that the optical configuration of the second optical channel makes it possible to obtain an image perceived by the soldier in the same direction as the direct image of the external scenery when a simple light intensifier is used, that is to say no image inverter, which is not the case when, for example, night vision goggles are used, in which case the intensifier must necessarily include an image inverter. This configuration simplifies the realization of the sight and reduces its cost.

The combination of the various optical components is placed in a mechanical assembly 21 which holds them together and protects them, the sight 2 having to be used in a military environment under extreme temperature and environmental conditions (humidity, rain, etc.). This mechanical assembly has a fastening interface (not shown in the diagram). This fastening interface allows the aiming sight to be fastened onto a weapon 31 and has no special features specific to the sight according to the invention.

Figure 2:
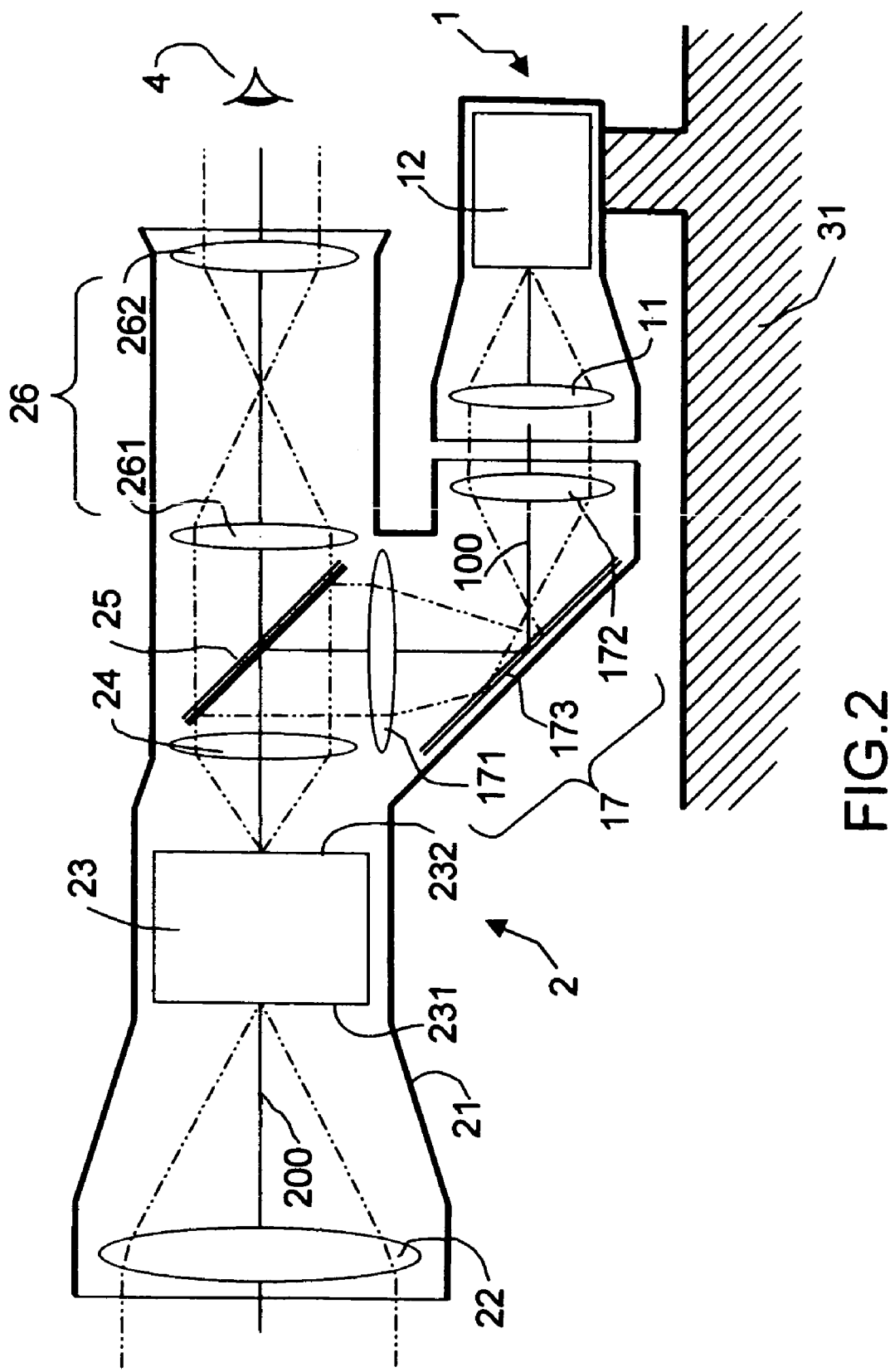
FIG. 2 shows said aiming sight of FIG. 1 mounted on the weapon.

FIG. 2 shows a diagram of the aiming sight mounted on a weapon 31. Mounted on the weapon 31 is a camera 1 comprising an objective 11 and a sensor 12, which may in particular be a CCD sensor. When the sight is mounted on the weapon, the first optical channel is placed in front of the objective of the camera, the optical axis 100 of the first optical channel being coincident with the optical axis of said objective. The exit pupil of the first optical channel is substantially coincident with the entrance pupil of the objective 11 of the camera 1 so that the optical transmission of the image is optimal without stopping-down of the optical field.

Figure 3:
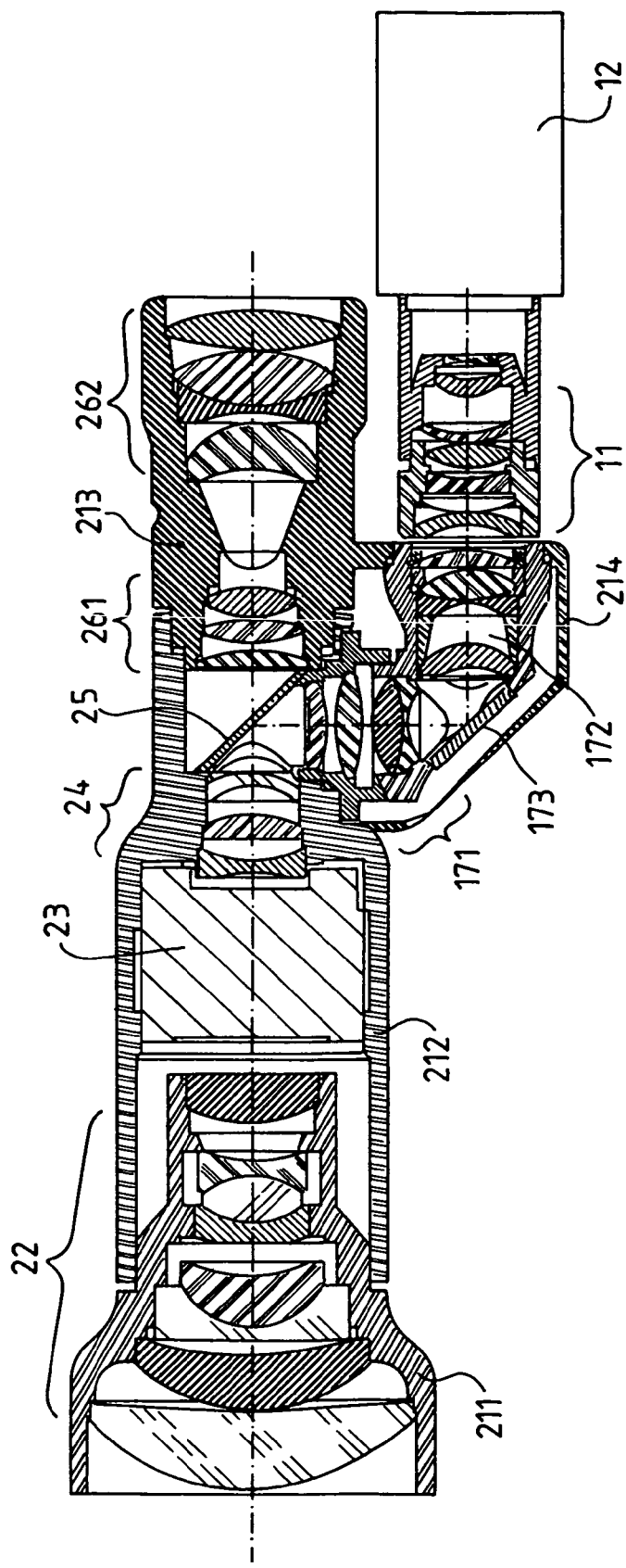
FIG. 3 shows a sectional view of one possible embodiment of the sight according to the invention.

FIG. 3 shows a sectional view of one possible embodiment of the sight according to the invention. The mechanical assembly 21 comprises a main body 212 that supports the light intensifier 23, the image transfer optic 24 and the semireflecting plate 25.

Mounted on this main body are:
  a second body 211, which supports the objective 22. In FIG. 3, this objective comprises four groups of lenses, giving a total of seven lenses;
  a third body 213 that supports the second relay optic 261 and the eyepiece 262. This third body may include a translational adjustment allowing dioptric adjustment of the eyepiece 262. In FIG. 3, the second relay optic comprises three convergent lenses and the eyepiece comprises three optical groups giving a total of four lenses; and
  a fourth body 214 that supports the optical unit 171, 172 and 173 of the first channel. The first relay optic comprises three lenses and the eyepiece 172 comprises four lenses.

This modular design makes it possible to modify one of the components, for example to change the objective 22 or to modify the fastening interface depending on the weapon chosen, without having to re-do the entire optomechanical design of the aiming sight.

In this example, the objective 11 placed in front of the sensor of the camera is an objective comprising six lenses.

Figure 4:
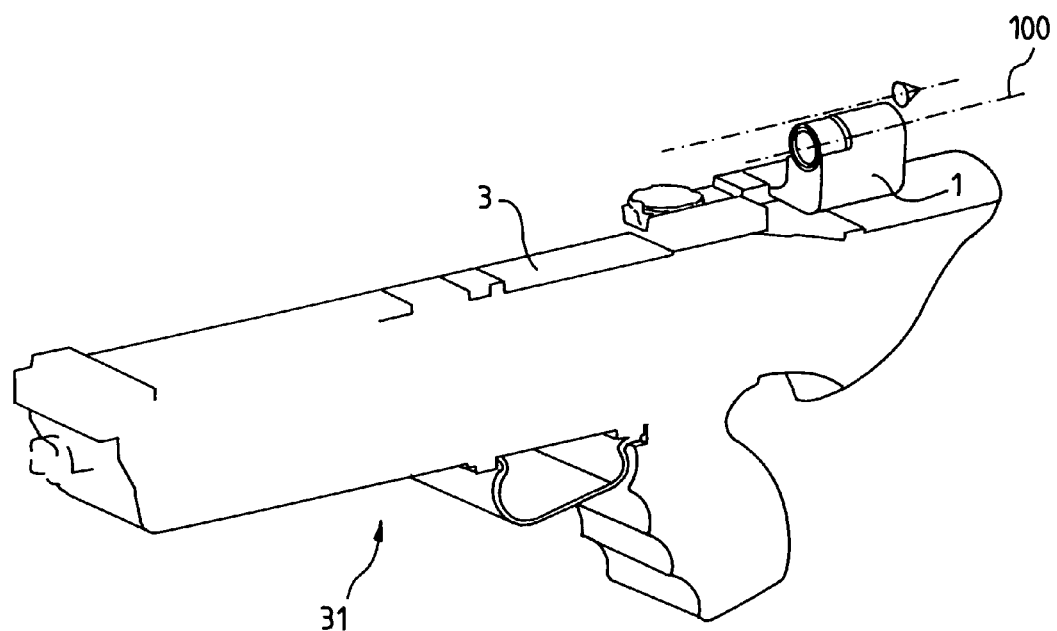
FIGS. 4 and 5 show two perspective views of a weapon with and without the aiming sight according to the invention.
Figure 5:
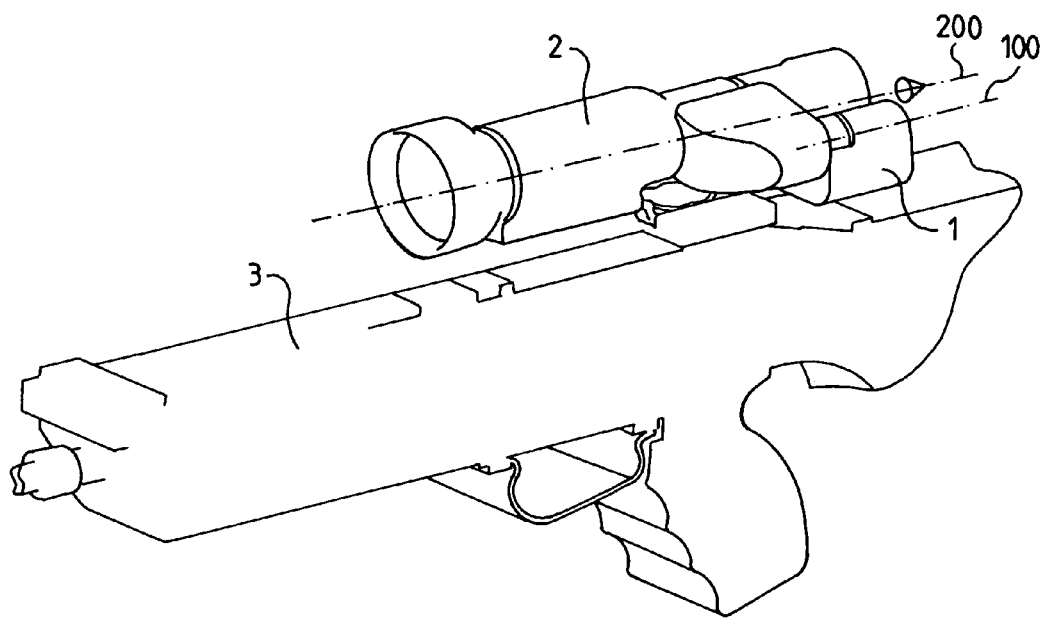

FIG. 4 is a perspective view of the weapon supporting its display camera 1 without the night vision aiming sight. The line of sight 100 of this camera is parallel to the line of sight of the weapon. The camera is small and displaced from the line of sight so as not to impede the soldier's direct view. This configuration allows the weapon to be used in the daytime. FIG. 5 is a perspective view of the weapon of FIG. 4 which this time includes the sight 2 (in solid lines in the figure). The sight is placed in such a way that the first optical channel is positioned in front of the objective of the camera. The exit pupil of the second optical channel is sufficiently far from the body of the sight, from the camera and from the weapon in such a way that the soldier can position his eye in said pupil with no great trouble.

Figure 6:
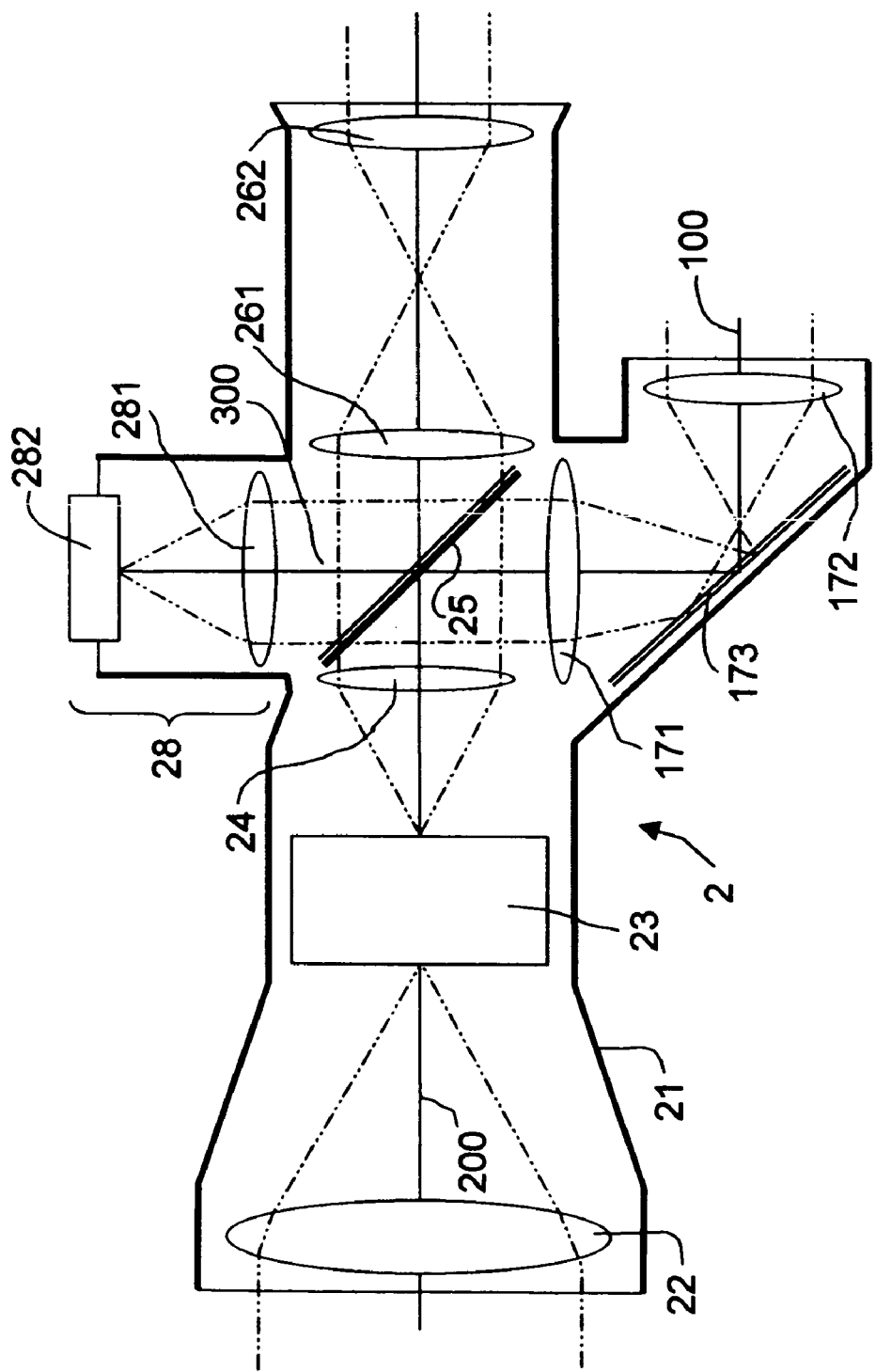
FIG. 6 shows a schematic view of a variant of the aiming sight, having a third optical channel possessing a microdisplay.

FIG. 6 shows a variant of the aiming sight according to the invention. The object of this variant is to add, in the free channel of the semireflecting plate 25, an image coming from a display 282. Thus, a combination 28 consisting of a display 282 and a second image transfer optic 281, which forms an intermediate image of the display 2, is added above the semireflecting plate 25. After reflection on the semireflecting plate 25, this intermediate image 25 is superimposed on the intensified image, coming from the image intensifier 24. Consequently, the soldier sees in the eyepiece 262 the information coming from the display superimposed on the intensified image of the external scenery. This information also reaches the camera by transmission through the semireflecting plate. The spectral emission bands of the display and of the intensifier tube may be different. In this case, the reflection and transmission coefficients of the semireflecting plate may be different depending on the spectral band, so as to give different preference to the first optical channel or to the second optical channel for each of the two images. The information provided by the display may especially be sight reticles. As a nonlimiting example, the display 282 may be a liquid-crystal display or a micromirror display device.

Figure 7:
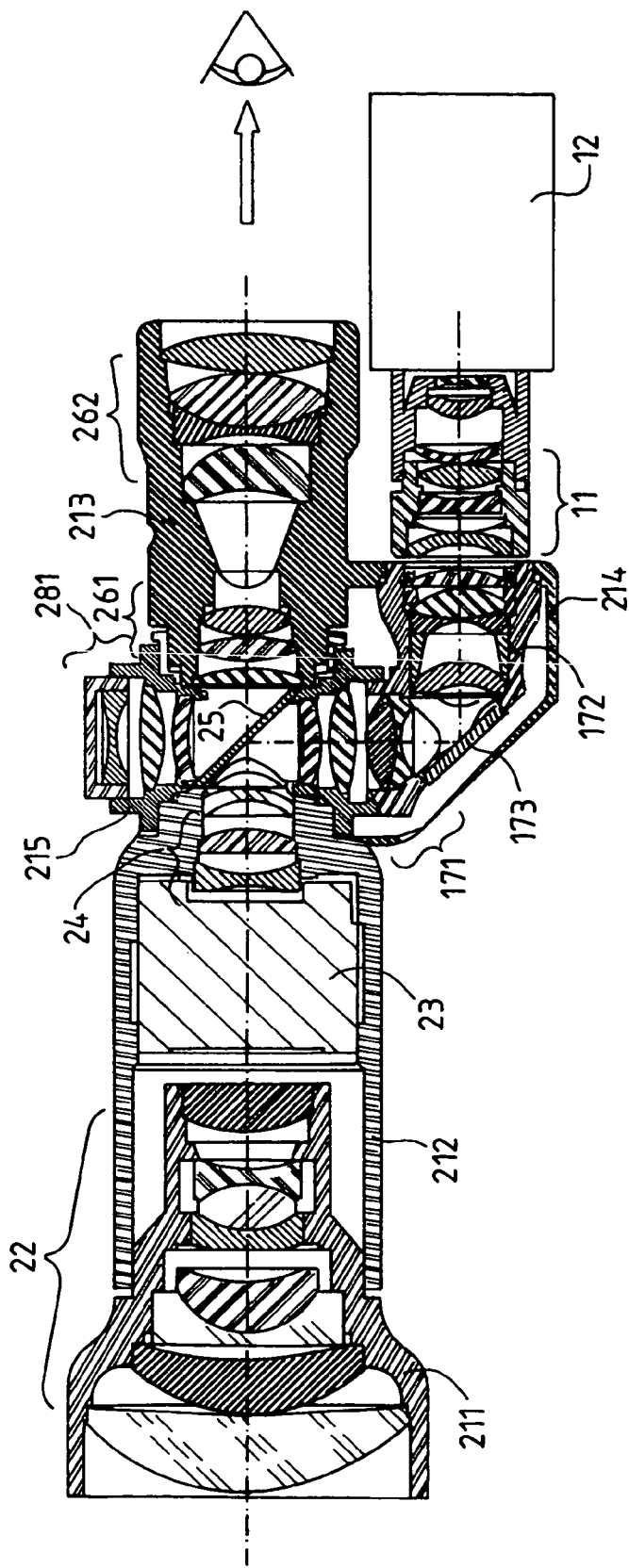
FIG. 7 shows a sectional view of one possible embodiment of the variant of the sight shown diagrammatically in FIG. 6.

FIG. 7 shows a sectional view of one possible embodiment of the variant of the sight 2 depicted in FIG. 6. The design of this sight is similar to that shown in FIG. 3. The main body 212 has simply been modified in its part lying above the semireflecting plate so as to house the mechanical component 215 that supports the objective 281. The display 282 is not shown in this figure. Although the sizes of the exit window of the intensifier 23 and of the display 282 are similar or identical, the first image transfer optic 24 and the second image transfer optic 281 are chosen to be identical so as to simplify the design of the sight, as illustrated in FIG. 7, in which these two optics have the same optical combination comprising three lenses.

The invention claimed is:

1. An aiming sight for a weapon having a sight camera whose optical axis is parallel to the axis of its barrel, comprising:
    an objective and an image intensifier, placed in a mechanical assembly having an interface for fastening on to said weapon, said objective forming the image of the external scenery on an entrance window of the image intensifier;
    a first optical channel configured to receive an intensified image from the image intensifier, and providing a first collimated image to the sight camera; and
    a second optical channel configured to receive the intensified image from the image intensifier, and providing a second image which is also collimated, the optical axis of the second optical channel is parallel to the optical axis of the first optical channel, the first and the second optical channels are arranged in such a way that, when the sight is mounted on the weapon via its fastening interface, the first collimated image is sent to the objective of the sight camera and the second image is sent to the eye of the soldier carrying the weapon.

2. The aiming sight as claimed in claim 1, wherein the first optical channel comprises at least one image transfer optic for the intensified image coming from the image intensifier, a semireflecting plate, a first relay optic, a first eyepiece, the final image from the first eyepiece being substantially collimated and an exit pupil of said first optical channel being substantially coincident with a entrance pupil of the objective of the camera when the sight is mounted on the weapon.

3. The aiming sight as claimed in claim 2, wherein the semireflecting plate is used in reflection in the first optical channel and in transmission in the second optical channel.

4. The aiming sight as claimed in claim 3, wherein the image intensifier is of the image inversion type.

5. The aiming sight as claimed in claim 3, wherein the sight also includes a third optical channel comprising a microdisplay composed of at least one display and of a third image transfer objective forming an intermediate image of the display, said intermediate image being sent by reflection and by transmission by the semireflecting plate on the one hand, into the first optical channel and, on the other hand, into the second optical channel superimposed on the intensified image from the image intensifier.

6. The aiming sight as claimed in claim 2, wherein the semireflecting plate is used in reflection in the first optical channel and in transmission in the second optical channel.

7. The aiming sight as claimed in claim 6, wherein the image intensifier is of the image inversion type.

8. The aiming sight as claimed in claim 6, wherein the sight also includes a third optical channel comprising a microdisplay composed of at least one display and of a third image transfer objective forming an intermediate image of the display, said intermediate image being sent by reflection and by transmission by the semireflecting plate on the one hand, into the first optical channel and, on the other hand, into the second optical channel superimposed on the intensified image from the image intensifier.

9. The aiming sight as claimed in claim 2, wherein the image intensifier is of the image inversion type.

10. The aiming sight as claimed in claim 2, wherein the sight also includes a third optical channel comprising a microdisplay composed of at least one display and of a third image transfer objective forming an intermediate image of the display, said intermediate image being sent by reflection and by transmission by the semireflecting plate on the one hand, into the first optical channel and, on the other hand, into the second optical channel superimposed on the intensified image from the image intensifier.

11. The aiming sight as claimed in claim 1, characterized in that wherein the second optical channel comprises at least an image transfer optic for the intensified image coming from the image intensifier, a semireflecting plate, a second relay optic, and a second eyepiece, the second eyepiece output an collimated image and said second optical channel further comprises an exit pupil positioned sufficiently far from a body of the sight, from the camera and from the weapon in such a way that the soldier can position his eye in said pupil with no great trouble.

12. The aiming sight as claimed in claim 11, wherein the image intensifier is of the image inversion type.

13. The aiming sight as claimed in claim 11, wherein the sight also includes a third optical channel comprising a microdisplay composed of at least one display and of a third image transfer objective forming an intermediate image of the display, said intermediate image being sent by reflection and by transmission by the semireflecting plate on the one hand, into the first optical channel and, on the other hand, into the second optical channel superimposed on the intensified image from the image intensifier.

14. The aiming sight as claimed in claim 1, wherein the image intensifier is of the image inversion type.

15. The aiming sight as claimed in claim 14, wherein the sight also includes a third optical channel comprising a microdisplay composed of at least one display and of a third image transfer objective forming an intermediate image of the display, said intermediate image being sent by reflection and by transmission by the semireflecting plate on the one hand, into the first optical channel and, on the other hand, into the second optical channel superimposed on the intensified image from the image intensifier.

16. The aiming sight as claimed claim 1, wherein the sight further includes a third optical channel, which comprises
    a microdisplay having at least one display; and
    a third image transfer objective forming an intermediate image, said intermediate image being sent by reflection and by transmission by a semireflecting plate on the one hand, into the first optical channel and, on the other hand, into the second optical channel superimposed on the intensified image from the image intensifier.

* * * * *